July 22, 1952    E. L. CLINE    2,603,968
PERFORMANCE INDICATING MEANS FOR USE WITH DYNAMOMETERS
Filed Dec. 19, 1944    6 Sheets-Sheet 1

Inventor
Edwin L. Cline
By Bacon & Thomas
Attorneys

Inventor
Edwin L. Cline
By Bacon + Thomas
Attorneys

July 22, 1952 E. L. CLINE 2,603,968
PERFORMANCE INDICATING MEANS FOR USE WITH DYNAMOMETERS
Filed Dec. 19, 1944 6 Sheets-Sheet 3

INVENTOR
EDWIN L. CLINE
BY
Bacon + Thomas
ATTORNEYS

July 22, 1952          E. L. CLINE          2,603,968
PERFORMANCE INDICATING MEANS FOR USE WITH DYNAMOMETERS
Filed Dec. 19, 1944          6 Sheets-Sheet 4
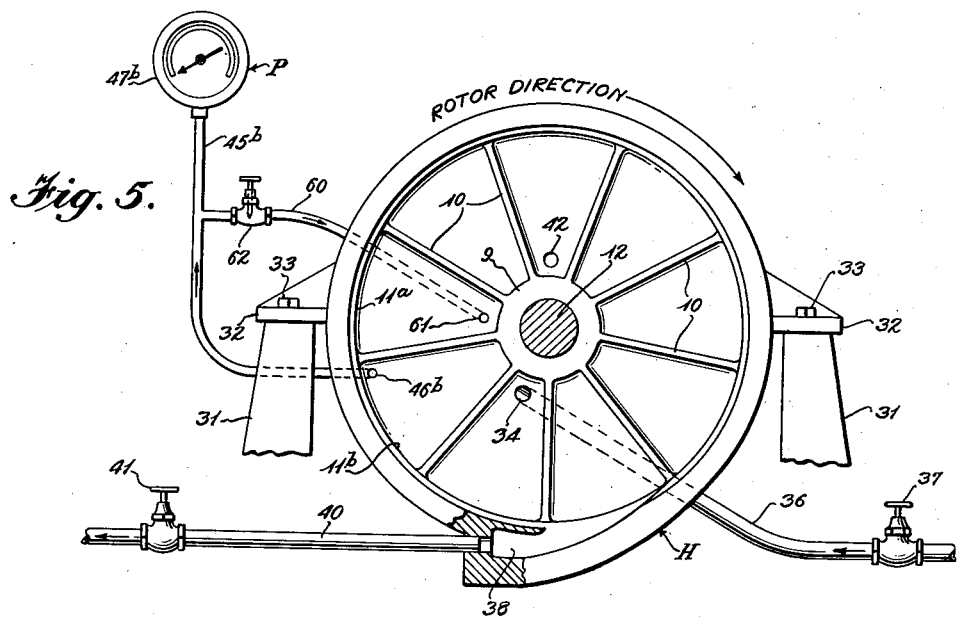
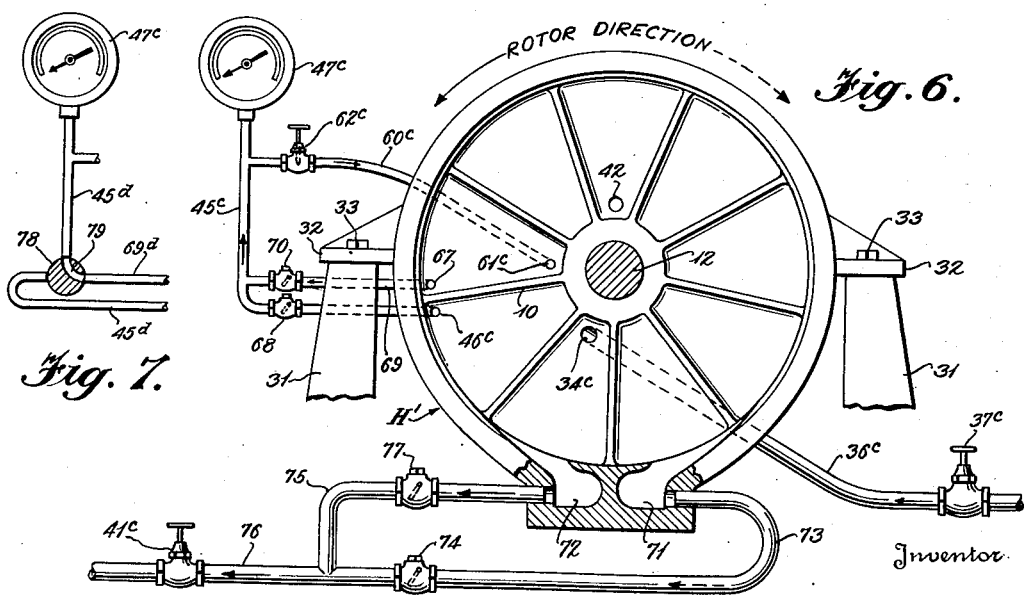
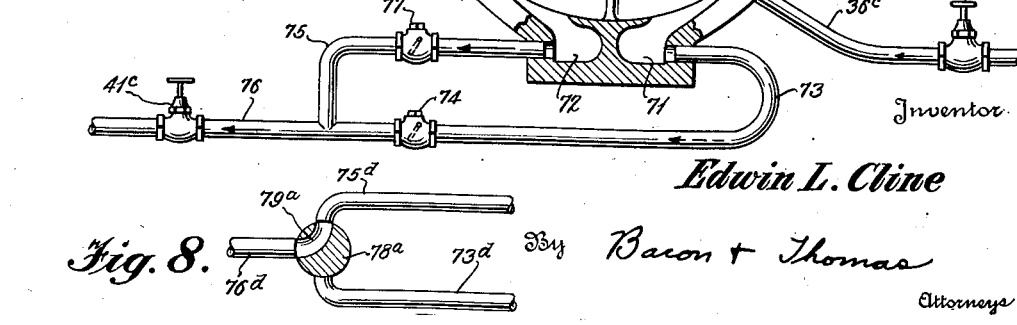
Inventor
Edwin L. Cline
By Bacon + Thomas
Attorneys

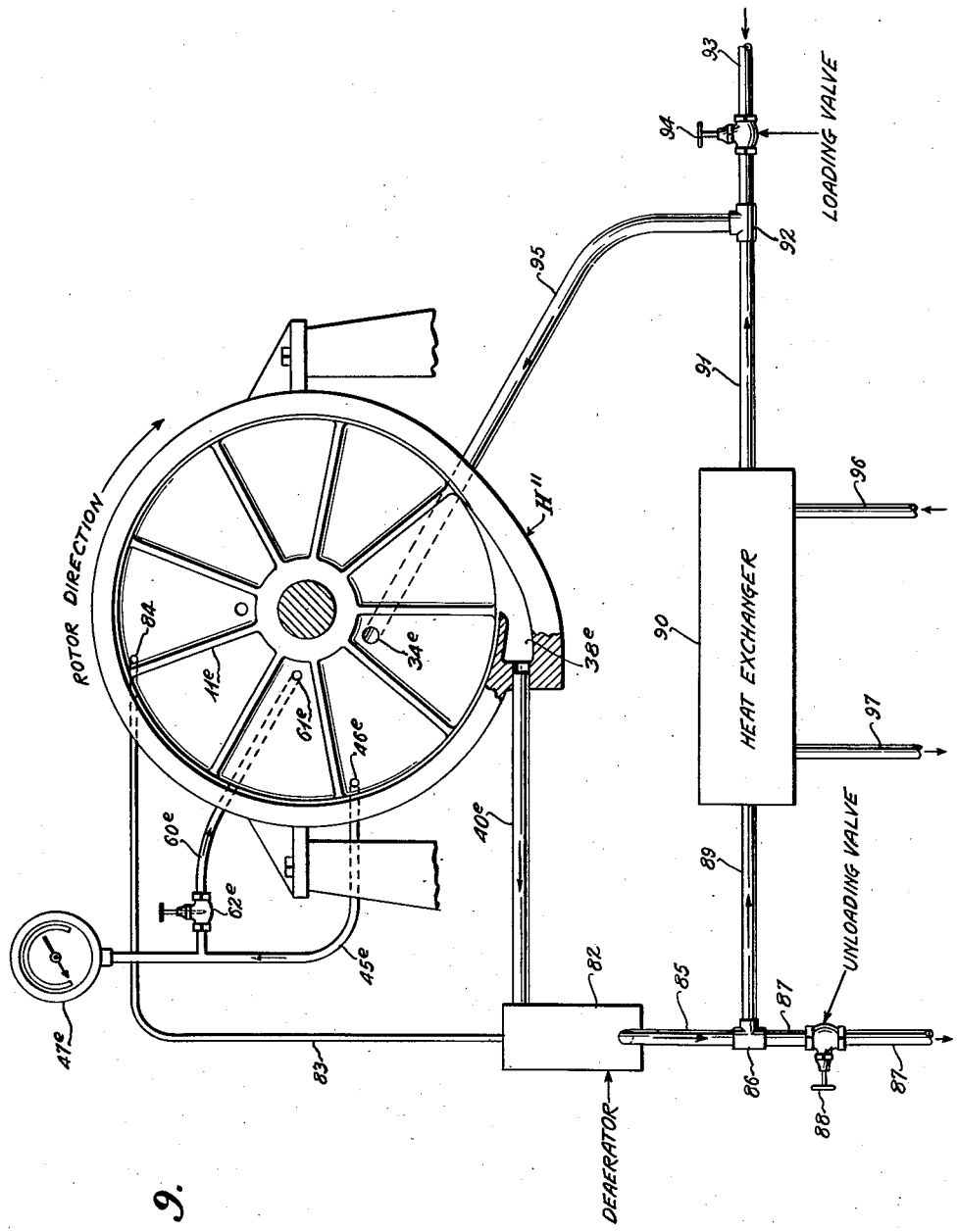

Patented July 22, 1952

2,603,968

UNITED STATES PATENT OFFICE 2,603,968

PERFORMANCE INDICATING MEANS FOR USE WITH DYNAMOMETERS

Edwin L. Cline, Pasadena, Calif., assignor to Clayton Manufacturing Company, Alhambra, Calif., a corporation of California Application December 19, 1944, Serial No. 568,828

30 Claims. (Cl. 73—134)

The present invention relates to novel performance indicating means for use with hydraulic dynamometers to indicate the torque performance characteristics of an engine or other prime mover being tested by the dynamometer.

It has been the common practice heretofore to construct hydraulic dynamometers so that the housing of the brake unit was mounted in cradle bearings to permit the housing to rotate bodily through a more or less limited angle in accordance with the torque being absorbed by the brake unit. Such brake units have necessarily included a torque arm and weight measuring equipment and in many instances expensive indicator instruments associated with the torque arm and weight measuring equipment in order to provide direct readings of the horsepower and speed, etc., developed by the engine undergoing test. Such measuring equipment is essential and highly desirable for certain types of testing and laboratory work. However, the cost thereof is prohibitive in certain other fields requiring the service of dynamometers but where great accuracy is not required and it is unnecessary to measure the results of the test in terms of a known unit of measure such as torque or horsepower. For example, in plants or shops where similar new internal combustion engines are to be tested under load after manufacture, or after overhauling or repair, or where the dynamometer is used for run-in purposes, it would be sufficient and practical to establish a desired standard of performance for any given type of engine and to test similar engines by comparison of their performance with the established standard. In such instances, inexpensive test equipment is the principal factor and it is obviously immaterial whether the engine performance is measured in terms of horsepower or some arbitrary unit.

In an effort to meet the demands for test equipment of the foregoing character, considerable experimental work was done and it was found that by tapping into the brake housing at certain points, the pressure produced by the movement of the brake fluid at such points, due to forced displacement and circulation caused by the rotation of the rotor, could be utilized as an operating medium for a pressure responsive indicating means. It was further found, as a matter of fact, that with various torque inputs, at any given speed, the indicated pressure as generated by the fluid movement in the housing, is directly proportional to the torque, and exceedingly accurate accordingly, all indicator readings obtained were directly proportional to the torque developed by the engine undergoing test.

It was also found that changes of pressure tap locations or the manifolding of one or more pressure taps would steepen or flatten the pressure indicating curve as plotted against actual torque input so that the various tap points could be used to obtain the desired curve.

Accordingly, the principal object of this invention is to provide simple and relatively inexpensive means for indicating the torque performance characteristics of a prime mover while being tested by a hydraulic dynamometer.

Another object of the invention is to provide sensitive performance indicating means for use with hydraulic dynamometers which can be readily adjusted and calibrated for use in indicating the performance of prime movers having different rated horsepowers falling within the capacity range of the brake unit.

A further object of the invention is to provide performance indicating means for use with reversible hydraulic dynamometers.

A still further object of the invention is to provide performance indicating means that may be employed with a dynamometer having a closed brake liquid circulating system associated therewith.

One of the important features of the present invention is that it enables the brake unit to be mounted upon fixed supports so that the usual cradle bearings, torque arm, etc., of conventional dynamometers, can be totally eliminated.

Other objects and features of the invention will be apparent from the following description taken in conjunction with the accompanying drawings, in which:

Figure 5 is a view similar to Figure 3 but illustrates another form of the performance indicating means, including a by-pass tube and means connected in said tube for calibrating the device for use in testing prime movers having widely varying ratings;

Figure 6 illustrates the manner in which the indicating device shown in Figure 5 can be associated with a reversible hydraulic power absorption unit;

Figure 7 is a detail view diagrammatically illustrating the manner in which a three-way valve may be utilized to selectively alter the connections between the pressure actuated gauge and the housing of a reversible dynamometer such as shown in Figure 6 to accommodate reversal of the direction of rotation of the rotor;

Figure 8 is another diagrammatic detail view illustrating the manner in which a three-way valve may be selectively used to effect the necessary change in connections to take care of the discharge of brake fluid from a reversible dynamometer such as shown in Figure 6 to accommodate reversal of the direction of rotation of the rotor;

Figure 10:
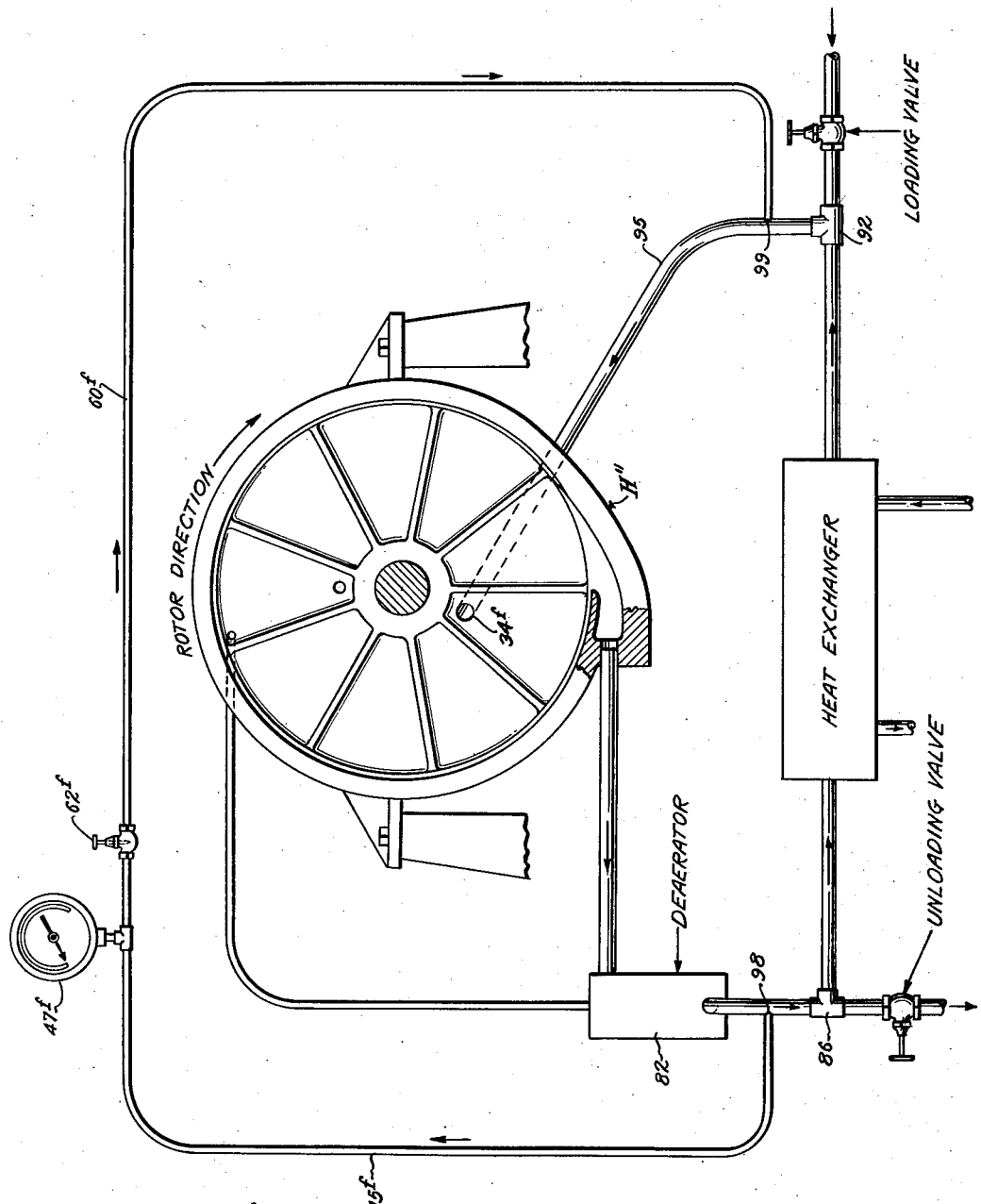

Figure 9 illustrates the manner in which the performance indicating means shown in Figure 5 can be connected to the housing of a hydraulic brake unit having a closed circulating system for the brake liquid associated therewith; and Figure 10 diagrammatically illustrates the brake unit and closed circulating system of Figure 9 with the performance indicating means arranged so that it is actuated in accordance with the pressure differential across the brake unit.

Figure 1:
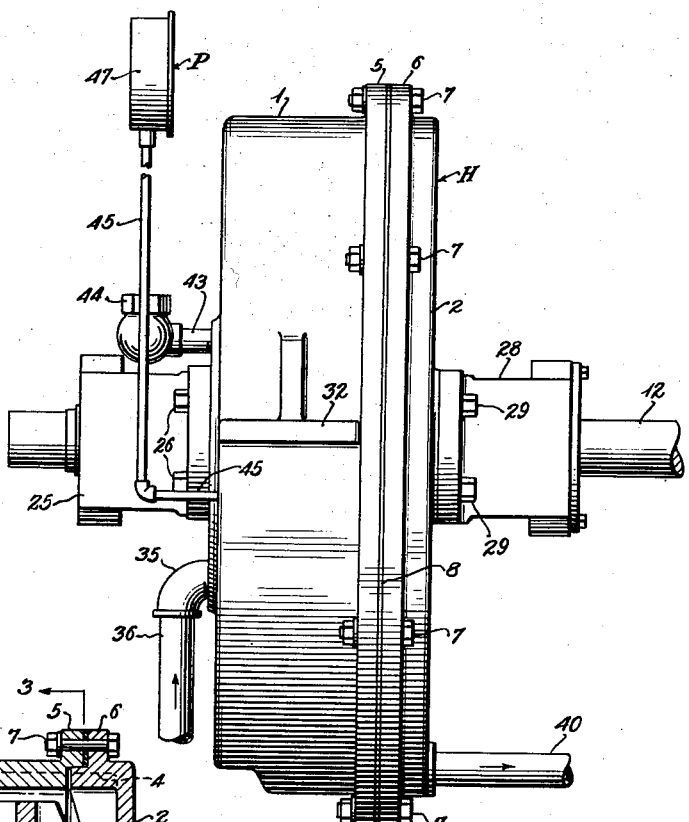
Figure 1 is an elevational view of a hydraulic power absorption unit having the performance indicating means of the present invention operatively associated therewith.
Figure 2:
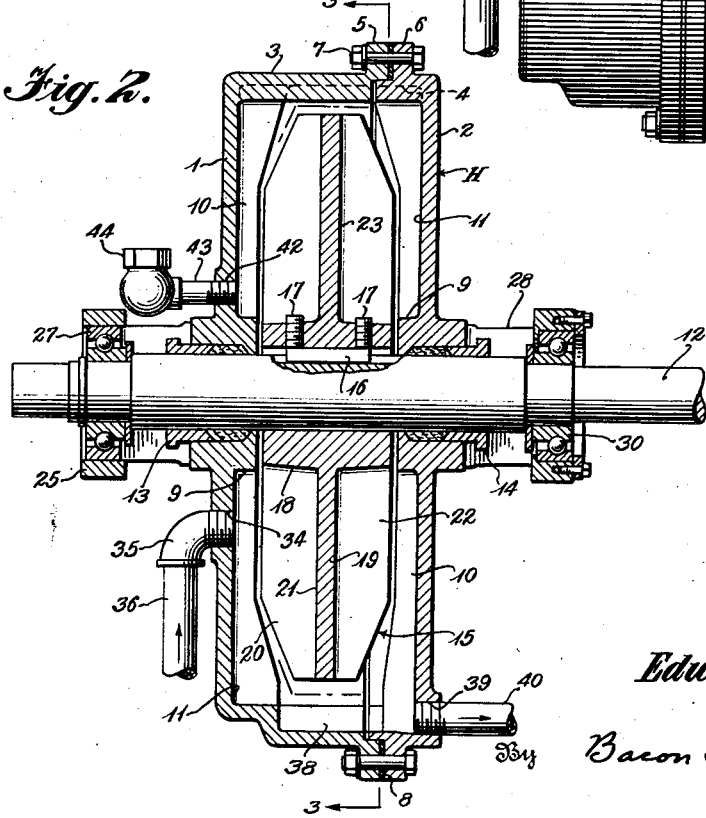
Figure 2 is a vertical sectional view through the hydraulic power absorption unit shown in Figure 1.

Referring now to Figs. 1 and 2 of the drawings, the hydraulic brake unit comprises a housing or stator generally indicated by the letter H and including sections 1 and 2 provided with side walls 3 and 4 terminating in mating flanges 5 and 6, respectively. A plurality of bolts 7 extend through the flanges 5 and 6 to secure the same together and gasket means 8 is interposed between the faces of the flanges to prevent leakage of fluid from the housing H. Each of the housing sections 1 and 2 includes a central hub 9 and a plurality of vanes 10 which extend outwardly from said hub to their respective side walls 3 and 4 so as to provide a series of pockets 11 in the respective housing sections. The vanes 10 may be arranged radially, as diagrammatically illustrated in Fig. 3, or the vanes may be arranged tangentially to the hub portions as illustrated and described in detail in my co-pending applications Serial No. 443,833, filed May 20, 1942, now Patent No. 2,452,550, and Serial No. 500,591, filed August 30, 1943.

A brake shaft 12 extends through the hub portions 9 and is sealed against leakage by stuffing boxes 13 and 14 (Fig. 2) mounted in the respective hubs. A rotor 15 is disposed within the housing H and is fixed to the shaft 12 by a key 16 held in place by set screws 17 extending through the hub 18 of the rotor 15. The rotor 15 includes a central disc-like portion 19 having a set of radial vanes 20 on one side thereof which provide a plurality of pockets 21 confronting the pockets 11 of the housing section 1. The rotor 15 also has a set of radial vanes 22 upon the opposite side of the disc-like portion 19 to provide a series of pockets 23 confronting the pockets 11 of the housing section 2. The number of pockets 11 in the housing sections 1 and 2 preferably differs from the number of pockets 21 and 23 of the rotor in order to avoid simultaneous alignment of all of the pockets and the production of harmonic vibrations. Thus, there may be nine of the pockets 11 in each of the housing sections 1 and 2 and only eight of the pockets 21 and 23 in the rotor.

The housing section 1 has a bracket 25 secured thereto by bolts 26 (Fig. 1), said bracket carrying an anti-friction bearing 27 (Fig. 2). The housing section 2 has a similar bracket 28 secured in place by bolts 29 and carries a similar anti-friction bearing 30. The portion of the shaft 12 projecting beyond the bearing 30 is adapted to be operatively connected by a universal joint or other suitable means (not shown) with the prime mover to be tested.

Inasmuch as rocking of the brake unit is unnecessary with the present performance indicating means P, the housing H may be conveniently mounted upon stationary supports 31 (Fig. 3) by means of lugs 32 projecting from the housing section 1. Bolts 33 fasten the lugs 32 to the supports 31.

The housing section 1 is provided with a threaded inlet opening 34 (Fig. 2) which is located at a low pressure zone of the housing and has a pipe elbow 35 mounted therein. A supply or inlet pipe 36 has one end thereof connected with the elbow 35 and its other end communicating with a source of brake liquid supply (usually water). A quick opening loading valve 37 (Fig. 3), which may be either manually or automatically controlled, is connected in the pipe 36 to control the supply of brake liquid to the brake housing H.

The housing sections 1 and 2 are shaped at the lower portions thereof so as to provide a pumping pocket 38, and the housing section 2 is provided with a threaded opening 39 (Fig. 2) communicating with said pocket. A waste pipe 40 has one end thereof threaded into the opening 39 and a quick opening unloading valve 41, which may be either manually or automatically controlled, is connected in the pipe 40 for controlling the rate of discharge of the brake liquid from the housing H. Thus, the brake unit illustrated in Fig. 3 is of the simple continuous flow type in which the loading of the brake unit is controlled by relative adjustment of the loading valve 37 and the unloading valve 41, the brake liquid being continuously forced out of the housing H by the pumping action of the rotor 15 at the same rate it is admitted.

The housing section 1 is further provided with a threaded opening 42 (Fig. 2) also located at a low pressure zone of the housing, and into which one end of a pipe nipple 43 is threaded. An air vent valve 44 is mounted upon the other end of said pipe nipple and serves to automatically vent the brake unit to the atmosphere to prevent the creation of a vacuum condition within the housing H.

The performance indicating device comprising the present invention is generally indicated by the letter P. This device includes a conduit 45 having one end thereof connected with a small opening 46 (Fig. 3) in the housing section 1 located in a pocket 11 close to the pressure side of one of the vanes 10 and adjacent the outer end of said vane. The opposite end of the conduit 45 is connected to a pressure actuatable gauge 47, or to any other pressure responsive means, such as a manometer (not shown). The gauge 47 may be provided with a needle 48 and an arbitrary scale 48ª calibrated to indicate engine torque performance.

Figure 3:
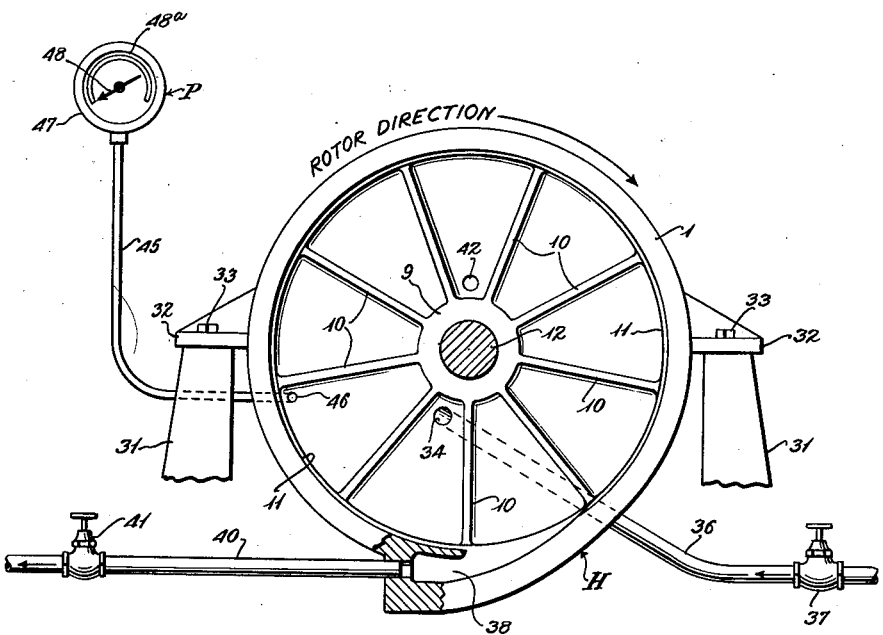
Figure 3 is a diagrammatic sectional view taken on the line 3—3 of Figure 2 and illustrating one manner in which the performance indicating means may be connected with the housing of the brake unit.

Let it be assumed that the shaft 12 has been connected with an engine to be tested and that the engine is driving the rotor 15 clockwise as indicated by the arrow in Fig. 3. The valves 37 and 41 are then adjusted so that the desired brake load is imposed upon the engine with the brake fluid entering and discharging from the housing H at a given rate in gallons per minute. It will be understood that, with the rotor 15 in motion, the fluid in the pockets 21 and 23 of the rotor will be forced outwardly under considerable centrifugal force. This liquid passes across the gap between the rotor and the housing creating a high pressure zone in the housing at the outer ends of the pockets 11 with the highest localized pressure in the pockets 11 adjacent the vanes 10 on the approach side thereof. The fluid thus entering the pockets 11 is diverted and flows inwardly between the vanes 10 of the housing until it reaches the inner diameter of the flow pattern, thence returning across the gap into the rotor pockets at its hub to be again discharged by centrifugal force. The path of movement of the brake fluid generally corresponds to that of a point on a rotating vortex ring. In other words, the brake liquid travels through a generally toroidal working circuit formed by the pockets in the housing and rotor. During its flow to the periphery of the rotor 15, the fluid absorbs kinetic energy and high pressure areas are thus created adjacent the outer ends of the pockets 11 with the greatest pressure zone occurring at a point close to the pressure side of the housing vanes 10. Hence, during the return flow of the brake fluid toward the hub 9 of the housing H, it gives up kinetic energy. Power is thus absorbed and converted into heat with a torque reaction on the housing exactly equal to the torque input through the shaft 12 to the rotor 15.

The amount of power absorbed, of course, is governed by the volume of fluid rotating within the working circuit so that by varying the volume of brake liquid, the load absorption capacity of the brake unit can be varied as desired.

In conducting a test utilizing the present performance indicating means, the load on the engine is gradually increased and the throttle opening is gradually increased until a predetermined comparative analysis speed of say, 1800 R. P. M is reached with the engine operating at full throttle. Inasmuch as the pressure developed by the movement of the liquid caused by the rotation of the rotor 15 is directly proportional to the torque, it will be apparent that the needle 48 of the gauge 47 will be actuated in accordance with the pressure and that the reading on the scale 48ª will correspond to the torque being developed. The torque reading of the gauge 47 is then noted and the brake unit is further loaded to reduce the speed to a predetermined low comparative analysis speed of say, 800 R. P. M. and the torque reading of the indicator 47 is again noted. If the torque readings at the above speeds satisfy the prescribed standards for the particular engine, then the engine may be considered to be operating satisfactorily. Otherwise, the necessary adjustments of the carburetor, etc., may be made and the test run repeated. A tachometer may be employed to determine the R. P. M. of the engine being tested.

Thus, the performance indicating device P provides a relatively simple and inexpensive means for indicating the comparative performance of an engine or other prime mover being tested by the dynamometer.

Figure 3A:
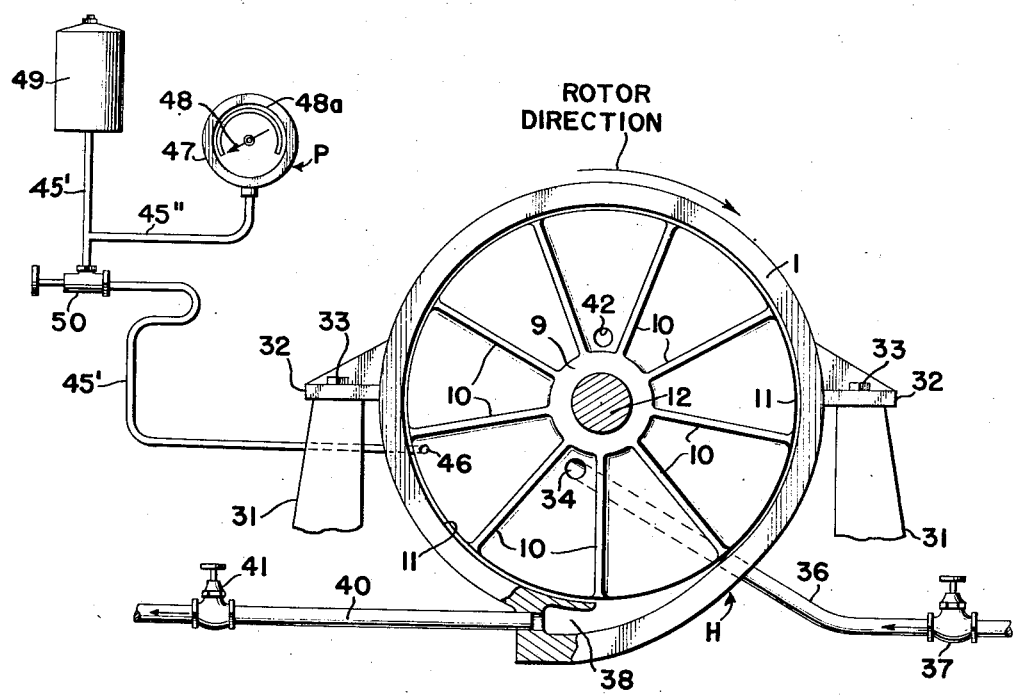
Figure 3A is a diagrammatic view somewhat similar to Figure 3 but including damping means for eliminating fluctuations in the readings of the indicating means.

In certain installations, any undue fluctuations in the reading of the performance indicating device P can be overcome by associating an air bell 49 with the pressure actuated gauge 47, as illustrated in Fig. 3A. Here, a conduit 45′ is shown connecting the high pressure tap opening 46 with the bell 49 and a manually adjustable dampening valve 50 is connected in the conduit 45′ to further reduce any pulsating effect on the gauge 47. The gauge itself may be connected by a conduit 45″ with the conduit 45′.

Figure 4:
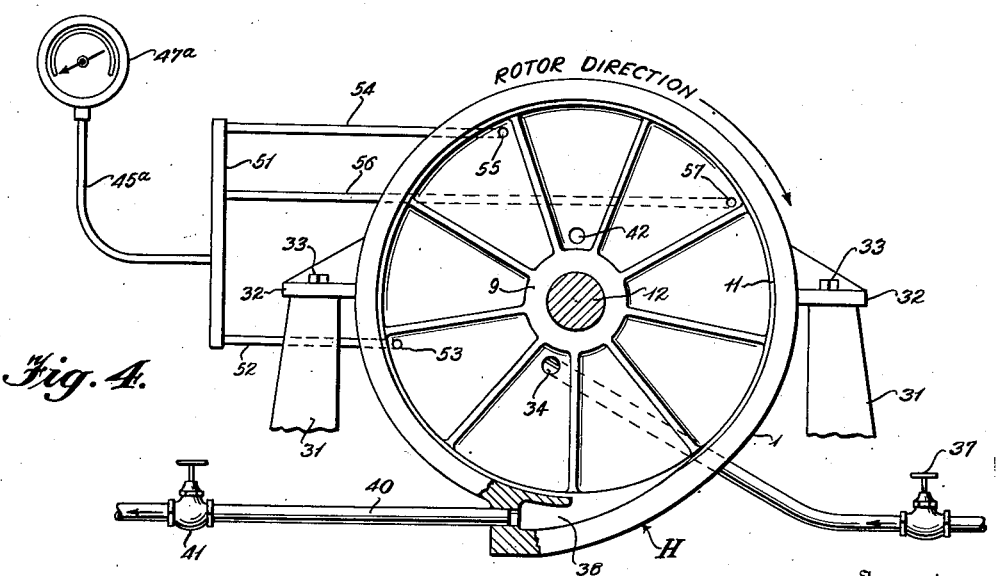
Figure 4 is a view somewhat similar to Figure 3 but illustrates the manner in which the performance indicating means may be connected with the brake housing at a plurality of points so that the indicator will be actuated by a mean housing pressure.

Figure 4 illustrates a modified arrangement of the apparatus of Fig. 3 in which a gauge 47ª is actuated in accordance with the mean pressure of a plurality of spaced, high pressure points in the brake housing. Thus, the gauge 47ª is connected by a conduit 45ª with a header 51. A first conduit 52 connects the header 51 with a small tap opening 53 located at a high pressure point in the housing H; a second conduit 54 connects the header with a similar tap opening 55; and a third conduit 56 connects the header 51 with another small high pressure tap opening 57. Thus, the pressure at the several points 53, 55 and 57 in the housing H is communicated to the header 51 and the mean pressure in said header is communicated through the conduit 45ª to effect actuation of the gauge 47ª. Of course, it will be understood that an air bell such as illustrated in Fig. 3 may be employed with the system illustrated in Fig. 4, if desired, and also with the systems described hereinafter, if desired.

Fig. 5 illustrates a construction in which the performance indicating means P is identically the same as that described in connection with Fig. 3, except that a by-pass or return tube 60 is shown connecting a conduit 45ᵇ with a small low pressure tap opening 61 in the brake housing, the tap opening 61 being located adjacent the hub 9 in a pocket 11ª adjacent the pocket 11ᵇ provided with the high pressure tap opening 46ᵇ. An adjustable needle valve 62 is connected in the return tube 60 and serves as a means for limiting the maximum pressure effective upon the gauge 47ᵇ, as well as serving as a means for calibrating the performance indicating means for use with engines of widely varying sizes falling within the capacity of the brake unit. Thus, in operation, it will be apparent that the by-pass tube 60 will serve to bleed back brake fluid from the high pressure tap opening 46ᵇ and return it to the housing H through the low pressure tap opening 61, the effective pressure on the gauge 47ᵇ thus being controlled. Hence, a sensitive gauge may be employed and its sensitivity maintained by properly adjusting the valve 62 so that engines of various horsepower ratings may be tested with the same accuracy without exceeding the operative range of the gauge.

Fig. 6 illustrates a further embodiment of the invention in which the performance indicating apparatus shown in Fig. 5 is adapted for use with a reversible dynamometer. Thus, a housing H′ in addition to being provided with tap openings 46ᶜ and 61ᶜ corresponding to the openings 46ᵇ and 61 of Fig. 5, is provided with an additional tap opening 67 arranged in the same pocket with the opening 61ᶜ but adjacent the outer end of said pocket so that it lies in a high pressure zone when the direction of rotation of the rotor is reversed from clockwise to counter-clockwise. The opening 46c is connected with a gauge 47c by a conduit 45c, the conduit 45c having a one-way check valve 68 arranged therein to permit flow of brake liquid only in a direction toward the gauge 47c. A conduit 69 connects the opening 67 with the conduit 45c and a one-way check valve 70 in the conduit 69 is arranged to permit flow only in a direction toward the gauge 47c. A by-pass or return conduit 60c connects the conduit 45c with the low pressure opening 61c, an adjustable needle valve 62c being connected in said return conduit to restrict the flow therethrough.

The housing H' further includes two discharge pockets 71 and 72, respectively. The discharge pocket 71 communicates with a pipe 73 having a one-way check valve 74 connected therein and arranged so as to permit flow in a direction away from the brake housing H'. The discharge pocket 72 has a pipe 75 connected therewith which may be conveniently merged with a waste pipe 76 at a point beyond the check valve 74. A one-way check valve 77 is arranged in the pipe 75 to allow flow of brake liquid only in a direction away from the housing H'. The rate of discharge of liquid from the brake housing H' may be controlled by a valve 41c connected in the waste pipe 76. Liquid is introduced into the housing H' through an opening 34c connected with an inlet pipe 36c having an inlet valve 37c connected therein. Loading and unloading of the reversible dynamometer is controlled by regulating the valves 37c and 41c.

Assuming that the housing H' has been loaded with the desired volume of brake liquid through the adjustment of the valves 37c and 41c, and assuming further that the rotor is turning counter-clockwise, as indicated by the full arrow in Fig. 6, the opening 67 will be subject to the high pressure developed by the movement of the brake liquid impelled through its tortuous path by the rotor, and this pressure will be transmitted through the conduit 69 and check valve 70 into the conduit 45c to act upon the gauge 47c. This pressure may be modified as desired by bleeding back a portion of the fluid through the return conduit 60c. The check valve 68 prevents any return of the fluid to the housing H' through the opening 46c which at this time is in a relatively low pressure zone. Simultaneously, liquid will be discharged from the pocket 72 through the pipe 75 due to the pumping action of the rotor, the check valve 77 permitting flow of brake liquid for discharge through the waste pipe 76, while the check valve 74 prevents any possible return of liquid back into the housing H' through the pipe 73.

When the direction of the rotor is reversed so that it turns clockwise, as indicated by the dotted arrow of Fig. 6, the opening 46c will be subject to high pressure, and this pressure will be communicated through the conduit 45c to the gauge 47c, the check valve 70 in the conduit 69 preventing the return of liquid therethrough to the housing through opening 67 which is now in a relatively low pressure zone. Similarly, liquid will be discharged from the housing H' through the pumping pocket 71, into pipe 73 and through check valve 74 into the waste pipe 76, the check valve 77 preventing return flow of the liquid to the housing H' at such time.

Thus, the apparatus shown in Fig. 6 automatically adjusts itself for the proper discharge of spent liquid from the housing H', as well as automatically adjusting itself to provide for actuation of the gauge 47c in accordance with the torque absorbed regardless of the direction in which the rotor may be turning.

Fig. 7 is a diagrammatic detail view illustrating the manner in which a selectively operable three-way valve 78 and conduits 45d and 69d may be associated with the gauge 47c in lieu of the conduits 45c and 69 and the check valves 68 and 70 shown in Fig. 6. The three-way valve 78 is provided with a port 79, which when in the position shown in Fig. 7, establishes communication between the conduit 69d and the conduit 45d in order to provide a gauge reading when the rotor is turning counter-clockwise. The three-way valve 78 is turned so that the port 79 interconnects the two portions of the conduit 45d to provide a gauge reading when the rotor is turning clockwise.

Fig. 8 diagrammatically illustrates the manner in which a selectively operable three-way valve 78a and pipes 73d, 75d and waste pipe 76d may be associated with the brake unit in lieu of the pipes 73, 75 and 76 and check valves 74 and 77 shown in Fig. 6. The three-way valve 78a is provided with a port 79a adapted to selectively connect the waste pipe 76d with the pipe 73d when the rotor is turning clockwise, or to connect the waste pipe 76d with the pipe 75d when the rotor is turning counter-clockwise.

Fig. 9 illustrates the dynamometer apparatus and performance indicating means of Fig. 5, associated with a closed circulating system for the brake liquid. Thus, the apparatus illustrated in Fig. 9 comprises a housing H'' provided with a high pressure tap opening 46e connected by a conduit 45e with a suitable pressure actuated gauge 47e. The housing H'' also includes a low pressure tap opening 61e connected by a by-pass or return conduit 60e with the conduit 45e. A calibrating needle valve 62e is arranged in the by-pass conduit 60e.

A pumping pocket 38e in the bottom of the housing H'' is connected by a pipe 40e with the inlet of a suitable or conventional deaerating device 82. A deaerating device which has been found to be highly satisfactory is illustrated and described in detail in my co-pending application Serial No. 500,591, supra. Air removed by the deaerator is returned through a tube 83 to the brake housing H'' through an opening 84 located adjacent the low pressure side of one of the vanes 11e.

The brake liquid is discharged from the deaerator 82 through a pipe 85 connected with one side of a T-fitting 86. The other side of the T-fitting 86 is connected with a discharge pipe 87 containing a quick acting unloading control valve 88. This valve may be either manually or automatically operated by any suitable remote control means (not shown). The stem of the T-fitting 86 is connected to one end of a pipe 89 and the opposite end of said pipe is connected to one side of a heat exchanger 90. The other side of the heat exchanger 90 is connected to one end of a pipe 91 and the other end of said pipe is connected to one side of a T-fitting 92. The opposite side of the T-fitting is connected to a supply pipe 93 containing a quick-operating load control valve 94, which may be manually operated or automatically operated through a remote control (not shown). The stem of the T-fitting 92 is connected by an inlet pipe 95 with an inlet opening 34e located at a low pressure point in the brake housing H''. The purpose of the heat exchanger 90 is to cool the brake liquid. The heat exchange device 90 may be water-cooled, in which event cooling water will be supplied thereto through a pipe 96 and discharged therefrom through a pipe 97, although the heat exchanger may be air-cooled if preferred.

It will be understood that, in the operation of the device shown in Fig. 9, the rotation of the rotor produces a pumping effect and causes a circulation of the brake liquid from the brake unit through pipe 40e, deaerator 82, pipes 85 and 89, heat exchanger 90, pipe 91, and pipe 95 back to the brake unit. However, it is to be understood that the deaerator 82 may be omitted from the closed circulating system if desired, although it affords numerous operating advantages as fully set forth in my co-pending application Serial No. 500,591, supra. One of the features of the closed circulating system is that the volume of brake liquid circulating through the system and governing the torque absorption capacity of the brake unit can be very accurately adjusted as desired by manipulating the loading valve 94 and the unloading valve 88 to establish and maintain any given constant load on the engine being tested. This is due to the fact that, with both valves closed, for any given volume of water forced out through the pocket 38e an equal volume is returned to the housing H" through the pipe 95. The performance indicating means 47e will then give a highly accurate indication of the performance characteristics of the engine being tested under the same load condition at various speeds for comparison with predetermined standard values. It will be apparent that with the closed system described, the unloading valve 88 may be opened to reduce the load in the event that a lighter load is desired during the test, or the loading valve 94 may be opened to admit additional brake liquid into the unit to increase the load if a heavier load is desired on the engine being tested.

Fig. 10 illustrates the preferred arrangement of a performance indicating means and a hydraulic power absorption apparatus associated with a closed circulating system for the brake liquid. It will be observed that the sole difference between the systems shown in Figs. 9 and 10 resides in the manner of connecting the performance indicating means with the remainder of the apparatus. Thus, instead of connecting the performance indicating device with the brake housing, the gauge 47f is connected by a conduit 45f with the closed circulating system at a point 98 adjacent the outlet of the housing H" and located between the outlet of the deaerator 82 (when a deaerator is used) and the pipe-T 86. A by-pass conduit 60f connects the conduit 45f with the brake liquid return conduit 95 of the closed system at a point 99 between the pipe-T 92 and the inlet opening 34f in the housing. An adjustable needle valve 62f is connected in the conduit 60f to restrict the flow therethrough as desired. The advantage of this arrangement is that the indicator gauge 47f is operated in accordance with the differential pressure across the brake unit instead of the differential pressure between two selected high and low pressure points of the housing. A further advantage resides in the fact that the brake housing may be of the reversible type, such as shown, for example, in Fig. 6, without necessitating any changes or switching in the points of connection of the performance indicating means with the closed circulating system.

It will be understood that various changes may be made in the details of construction, arrangement, and interconnection of the elements disclosed herein, and that the performance indicating means obviously may be applied with advantage to various hydraulic dynamometers of the cradled type, all without departing from the spirit of the invention or the scope of the annexed claims.

What I claim is:

1. Dynamometer apparatus, comprising: a hydraulic power absorption unit including a housing having generally radially extending vanes on the interior thereof, a shaft, a rotor in said housing fixed to said shaft and rotatable with said shaft, said rotor having vanes spaced axially from said housing vanes, said shaft being adapted to be connected with a prime mover to be tested; and pressure-responsive indicator means communicating with the interior of said housing at a high pressure point on one side of at the least one of said housing vanes and actuated by the pressure of the brake fluid produced by the rotation of said rotor for indicating the torque developed by the prime mover undergoing test.

2. Dynamometer apparatus, comprising: a hydraulic power absorption unit including a housing, a plurality of generally radial vanes in said housing, said housing having an inlet and an outlet for brake liquid, a shaft adapted to be connected with a prime mover to be tested, a vaned rotor in said housing, the vanes of said housing being disposed on at least one side of said rotor, said rotor being fixed to said shaft for rotation therewith; indicating means actuable by the pressure of said brake liquid produced by the rotation of said rotor; and conduit means connecting said indicating means with said housing at a point on the high pressure side of one of the vanes of said housing and adjacent the outer end of said vane.

3. Dynamometer apparatus, comprising: a hydraulic power absorption unit including a housing, a plurality of vanes in said housing providing a series of separate pockets, said housing having an inlet and an outlet for brake liquid, a shaft adapted to be connected to a prime mover to be tested; a rotor in said housing, a plurality of vanes on said rotor providing a series of separate pockets confronting the pockets of said housing, said rotor being fixed to said shaft for rotation therewith; a gauge device operable by the pressure of said brake liquid produced by the rotation of said rotor; a conduit connecting said gauge device with a high pressure zone of one of the pockets of said housing; and by-pass means communicating at one end thereof with said conduit and communicating at its other end with one of the pockets of said housing at a low pressure zone thereof.

4. Dynamometer apparatus, comprising: a hydraulic power absorption unit including a housing having internal vanes, said housing having an inlet and an outlet for brake liquid, a shaft adapted to be connected with a prime mover to be tested, a rotor in said housing having vanes cooperable with said housing vanes to provide a working circuit for brake liquid, said rotor being fixed to said shaft for rotation therewith; means for varying the volume of brake liquid in said housing to vary the load absorption capacity of the apparatus; an indicator operated by the pressure of said brake liquid produced by the rotation of said rotor; a conduit connecting said indicator with the interior of said housing at a high pressure zone of said housing; by-pass means connected at one end with said conduit and communicating at its other end directly with the interior of said housing at a low pressure point thereof; and means in said by-pass means for restricting the return flow therethrough of brake liquid to said housing.

5. Dynamometer apparatus, comprising: a hydraulic power absorption unit including a housing, a plurality of vanes in said housing providing a series of pockets, said housing having an inlet and an outlet for brake liquid, a shaft adapted to be connected with a prime mover to be tested, a rotor in said housing, a plurality of vanes on said rotor providing a series of pockets cooperable with the pockets of said housing, said rotor being fixed to said shaft for rotation therewith; a gauge operable by the pressure of said brake liquid produced by the rotation of said rotor; conduit means connecting said pressure gauge with a high pressure point of at least one of the pockets of said housing; return conduit means connected at one end with said conduit and communicating at its other end with at least one of the pockets of said housing at a low pressure point thereof; and an adjustable needle valve in said return conduit means.

6. Dynamometer apparatus, comprising: a hydraulic power absorption unit including a housing, a plurality of vanes in said housing providing a series of separate pockets, said housing having an inlet and an outlet for brake liquid, a shaft adapted to be connected to a prime mover to be tested, a rotor in said housing, a plurality of vanes on said rotor providing a series of pockets confronting the pockets of said housing, said rotor being fixed to said shaft for rotation therewith; pressure actuatable indicating means; and conduit means connecting said indicating means with a high pressure area of a plurality of the pockets of said housing, whereby to cause said indicating means to be actuated by the mean pressure of the brake liquid produced by the rotation of said rotor corresponding to the torque developed by the prime mover undergoing test.

7. Dynamometer apparatus, comprising: a hydraulic power absorption unit including a housing, a plurality of vanes in said housing, said housing having an inlet and an outlet for brake liquid, a shaft adapted to be connected with a prime mover to be tested, a vaned rotor in said housing, said rotor being fixed to said shaft for rotation therewith; a pressure actuated gauge; conduit means interconnecting said pressure actuated gauge with said housing at high pressure points on both sides of one of the vanes of said housing; and means selectively connecting said gauge with a given one of said points depending upon the direction of rotation of said rotor in order to obtain a reading corresponding to the torque developed by the prime mover undergoing test regardless of the direction in which the rotor is turning.

8. Dynamometer apparatus, comprising: a hydraulic power absorption unit including a housing, a plurality of vanes in said housing, said housing having an inlet and an outlet for brake liquid, a shaft adapted to be connected with a prime mover to be tested, a vaned rotor in said housing, said rotor being fixed to said shaft for rotation therewith; a pressure actuated gauge; conduit means interconnecting said pressure actuated gauge with said housing at a point which lies in a high pressure zone when said rotor is turning in one direction and with a point in a similar zone when said rotor is turning in the opposite direction; means selectively connecting said gauge with a given one of said points depending upon the direction of rotation of said rotor in order to obtain a reading corresponding to the torque developed by the prime mover undergoing test regardless of the direction in which the rotor is turning; and by-pass means having one end thereof connected with said conduit means and its other end communicating with said housing at a low pressure zone thereof.

9. Dynamometer apparatus, comprising: a hydraulic power absorption unit including a housing having internal vanes, a shaft adapted to be connected with a prime mover to be tested, a rotor in said housing having vanes cooperable with said housing vanes to provide a working circuit for brake liquid, said rotor being fixed to said shaft for rotation therewith, said housing having an inlet and an outlet for brake liquid; means normally filled with brake liquid connected with said inlet and said outlet providing a closed circulating system for said brake liquid; means for controlling and varying the volume of brake liquid in said closed circulating system, whereby a given constant volume of liquid may be maintained in said closed circulating system to provide a desired constant brake load; and indicating means communicating with the interior of said housing at a high pressure point thereof and responsive to the pressure of the brake liquid produced by the rotation of said rotor for indicating the torque developed by the prime mover under said desired constant load.

10. Dynamometer apparatus, comprising: a hydraulic power absorption unit including a housing provided with a series of pockets interiorly thereof, a shaft adapted to be connected with a prime mover to be tested, a rotor in said housing having a series of pockets cooperable with the pockets of said housing to form a working circuit for brake liquid, said rotor being fixed to said shaft for rotation therewith, said housing having an inlet and an outlet for said brake liquid; means connected with said inlet and said outlet providing a closed circulating system for said brake liquid; means for controlling and varying the volume of brake liquid in said closed circulating system, whereby any given constant volume of liquid may be maintained in said closed circulating system to provide a desired constant brake load; a pressure actuated gauge; conduit means connecting said pressure actuated gauge with a high pressure zone of one of the pockets of said housing, whereby said gauge is actuated by pressure corresponding to the torque developed by said prime mover under said desired constant load; and by-pass means connecting said conduit with a relatively low pressure zone in one of said pockets of said housing.

11. Dynamometer apparatus, comprising: a hydraulic power absorption unit including a housing having internal vanes, a shaft adapted to be connected to a prime mover to be tested, a rotor in said housing having vanes cooperable with said housing vanes to provide a working circuit for brake liquid, said rotor being fixed to said shaft for rotation therewith, said housing having an inlet and an outlet for brake liquid; means normally filled with brake liquid connected with said inlet and said outlet providing a closed circulating system for said brake liquid; means for controlling and varying the volume of brake liquid in said closed circulating system, whereby any given constant volume of liquid may be maintained in said closed circulating system to provide a desired constant brake load; a pressure responsive gauge; and conduit means connecting said pressure responsive gauge with said closed circulating system at a point adjacent the outlet of said housing, whereby said gauge is actuated by brake liquid pressure corresponding to the torque developed by said prime mover under said desired constant load.

12. Dynamometer apparatus, comprising: a hydraulic power absorption unit including a housing having internal vanes, a shaft adapted to be connected with the prime mover to be tested, a rotor in said housing having vanes cooperable with said housing vanes to provide a working circuit for brake liquid, said rotor being fixed to said shaft for rotation therewith, said housing having an inlet and an outlet for brake liquid; means normally filled with brake liquid connected with said inlet and said outlet providing a closed circulating system for said brake liquid; means for controlling and varying the volume of brake liquid in said closed circulating system, whereby any given constant volume of liquid may be maintained in said closed circulating system to provide a desired constant brake load; a pressure responsive gauge; conduit means connecting said pressure responsive gauge with said closed circulating system at a point adjacent the outlet of said housing; and return means connecting said conduit with said closed circulating system at a point adjacent the inlet of said housing, whereby said pressure responsive gauge is actuated by the pressure differential across said hydraulic power absorption unit corresponding to the torque developed by said prime mover under said desired constant load.

13. Dynamometer apparatus, comprising: a hydraulic power absorption unit including a housing having internal vanes, a shaft adapted to be connected with the prime mover to be tested, a rotor in said housing having vanes cooperable with said housing vanes to provide a working circuit for brake liquid, said rotor being fixed to said shaft for rotation therewith, said housing having an inlet and an outlet for brake liquid; means normally filled with brake liquid connected with said inlet and said outlet providing a closed circulating system for said brake liquid; means for controlling and varying the volume of brake liquid in said closed circulating system, whereby any given constant volume of liquid may be maintained in said closed circulating system to provide a desired constant brake load; pressure responsive indicating means; conduit means connecting said pressure responsive indicating means with said closed circulating system at a point adjacent the outlet of said housing; a return tube connecting said conduit with said closed circulating system at a point adjacent the inlet of said housing, whereby said pressure responsive gauge is actuated by the pressure differential across said hydraulic power absorption unit corresponding to the torque developed by said prime mover under said desired constant load; and flow restricting means in said return tube.

14. Dynamometer apparatus, comprising: a hydraulic power absorption unit including a housing, a shaft adapted to be connected with a prime mover to be tested, a rotor in said housing, said rotor being fixed to said shaft for rotation therewith, said housing having an inlet and an outlet for brake liquid; means connected with said inlet and said outlet providing a closed circulating system for said brake liquid; means for controlling and varying the volume of brake liquid in said closed circulating system, whereby a given constant volume of liquid may be maintained in said closed circulating system to provide a desired constant load; pressure-actuated indicating means; and means connecting said pressure-actuated indicating means with said housing at a high pressure zone of said housing spaced from said outlet, so that said pressure-actuated indicating means is responsive to the variations in pressure of the brake liquid produced by the circulation of said brake liquid within said housing induced by rotation of said rotor at different speeds for indicating the torque developed by the prime mover under said desired constant load.

15. Dynamometer apparatus, comprising: a hydraulic power absorption unit including a housing, a shaft adapted to be connected with a prime mover to be tested, a rotor in said housing, said rotor being fixed to said shaft for rotation therewith, said housing having an inlet and an outlet for brake liquid; means connected with said inlet and said outlet providing a closed circulating system for said brake liquid; means for controlling and varying the volume of brake liquid in said closed circulating system, whereby a given constant volume of liquid may be maintained in said closed circulating system to provide a desired constant load; pressure-actuated indicating means; conduit means establishing communication between said pressure-actuated indicating means and a zone of high pressure in said housing; and return conduit means establishing communication between said pressure-actuated indicating means and a zone of relatively low pressure in said housing, whereby said pressure-actuated indicating means is actuated in accordance with the changes in the pressure differential across said zones at different speeds under said desired constant load.

16. Dynamometer apparatus, comprising: a hydraulic power absorption unit including a housing, a shaft adapted to be connected with a prime mover to be tested, a rotor in said housing, said rotor being fixed to said shaft for rotation therewith, said housing having an inlet and an outlet for brake liquid and said housing and rotor being constructed to provide for circulation of brake liquid in a tortuous path within said housing; means connected with said inlet and said outlet cooperating with said housing to provide a closed circulating system for said brake liquid; means for controlling and varying the volume of brake liquid in said closed circulating system, whereby a given constant volume of liquid may be maintained in said closed circulating system to provide a desired constant load; pressure-actuated indicating means; and conduit means establishing communication between said pressure-actuated indicating means and two zones of the apparatus subject to different circulating pressures, whereby said pressure-actuated indicating means is actuated in accordance with the changes in the pressure differential across said zones at different speeds under said desired constant load.

17. Dynamometer apparatus as defined in claim 15, in which the return conduit has a return flow control valve connected therein.

18. Dynamometer apparatus, comprising: hydraulic power absorption means including a housing and rotatable means in said housing adapted to be connected with a prime mover to be tested, said housing and rotatable means both being vaned to provide open pockets confronting each other and forming a generally toroidal circulation path for brake liquid within said housing; and pressure-responsive indicating means communicating with a high pressure zone of said housing and being directly responsive to the hydraulic pressure developed in said brake liquid by said rotatable means for indicating the power being developed by said prime mover.

19. Dynamometer apparatus, comprising: hydraulic power absorption means including a housing and rotatable means in said housing adapted to be connected with a prime mover to be tested; means for varying the volume of brake liquid in said housing, said housing and rotatable means both being vaned to provide open pockets confronting each other and forming a generally toroidal circulation path for said brake liquid within said housing; and pressure-responsive indicating means communicating with a high pressure zone of said housing and being directly responsive to the hydraulic pressure developed in said brake liquid by said rotatable means for indicating the power being developed by said prime mover.

20. Dynamometer apparatus, comprising: hydraulic power absorption means including a housing and rotatable means in said housing adapted to be connected with a prime mover to be tested, said housing and rotatable means both being vaned to provide open pockets confronting each other and forming a generally toroidal circulation path for brake liquid within said housing; pressure-responsive indicating means communicating with a high pressure zone of said housing and being directly responsive to the hydraulic pressure developed in said brake liquid by said rotatable means for indicating the power being developed by said prime mover; and damping means interposed between said housing and indicating means for eliminating fluctuations in the readings of said indicating means.

21. Dynamometer apparatus, comprising: a hydraulic power absorption unit including a housing, a plurality of vanes in said housing providing a series of pockets, said housing having an inlet and an outlet for brake liquid, a shaft adapted to be connected with a prime mover to be tested, a rotor in said housing, a plurality of vanes on said rotor providing a series of pockets cooperable with the pockets of said housing to provide a generally toroidal circulation path for the brake liquid, said rotor being fixed to said shaft for rotation therewith; a gauge operable by the pressure of said brake liquid produced by the rotation of said rotor; conduit means connecting said pressure gauge with a high pressure point of at least one of the pockets of said housing; and other conduit means communicating at one end with said first-mentioned conduit means and communicating at its other end with at least one of the pockets of said housing at a low pressure point thereof.

22. Dynamometer apparatus, comprising: a hydraulic power absorption unit including a housing, a plurality of vanes in said housing, said housing having inlet means and outlet means for brake liquid, a shaft adapted to be connected with a prime mover to be tested, and a vaned rotor in said housing, said rotor being fixed to said shaft for rotation therewith; a pressure actuated gauge; conduit means interconnecting said pressure actuated gauge with said housing at a point which lies in a high pressure zone when said rotor is turning in one direction and with a point in a similar zone when said rotor is turning in the opposite direction; and means selectively connecting said gauge with a given one of said points depending upon the direction of rotation of said rotor in order to obtain a reading corresponding to the torque developed by the prime mover undergoing test regardless of the direction in which the rotor is turning.

23. Dynamometer apparatus as defined in claim 22, in which the means selectively connecting the pressure actuated gauge with the high pressure zones of the housing, comprises a three-way valve interposed in the conduit means at a region between the gauge and housing.

24. Dynamometer apparatus as defined in claim 22, in which the means selectively connecting the pressure actuated gauge with the high pressure zones of the housing, comprises a pair of conduits each having a check valve connected therein arranged to open only in a direction toward said gauge.

25. Dynamometer apparatus as defined in claim 22, in which the outlet means comprises a pair of opposed discharge pockets formed in said housing, and which includes a conduit connected with each discharge pocket, and a check valve connected in each of said conduits arranged to allow flow only in a direction away from said housing.

26. Dynamometer apparatus as defined in claim 22, in which the outlet means comprises a pair of opposed discharge pockets formed in said housing, and which includes a discharge conduit connected with each of said discharge pockets by a branch conduit, and a three-way valve connected in said discharge conduit for selectively connecting said discharge conduit with either of said branch conduits, in accordance with the direction of rotation of the rotor.

27. Dynamometer apparatus, comprising: a hydraulic power absorption unit including a housing provided with a series of pockets interiorly thereof, a shaft adapted to be connected with a prime mover to be tested, a rotor in said housing having a series of pockets cooperable with the pockets of said housing, said rotor being fixed to said shaft for rotation therewith, said housing having an inlet and an outlet for brake liquid; means connected with said inlet and said outlet providing a closed circulating system for said brake liquid; means for controlling and varying the volume of brake liquid in said closed circulating system, whereby any given constant volume of liquid may be maintained in said closed circulating system to provide a desired constant brake load; a pressure actuated gauge; conduit means connecting said gauge with a high pressure zone of said housing, whereby said gauge is actuated by pressure corresponding to the torque developed by said prime mover under said desired constant load; and conduit means connecting said first-mentioned conduit means with a relatively low pressure zone of said housing.

28. Dynamometer apparatus, comprising: a hydraulic power absorption unit including a housing provided with a series of pockets interiorly thereof, a shaft adapted to be connected with a prime mover to be tested, a rotor in said housing having a series of pockets cooperable with the pockets of said housing to form a working circuit for brake liquid, said rotor being fixed to said shaft for rotation therewith, said housing having an inlet and an outlet for said brake liquid; means connected with said inlet and said outlet providing a closed circulating system for said brake liquid; means for controlling and varying the volume of brake liquid in said closed circulating system, whereby any given constant volume of liquid may be maintained in said closed circulating system to provide a desired constant brake load; a pressure actuated gauge; and conduit means connecting said pressure actuated gauge with a high pressure zone of one of the pockets of said housing, whereby said gauge is actuated by pressure corresponding to the torque developed by said prime mover under said desired constant load.

29. Dynamometer apparatus, comprising: a hydraulic power absorption unit including a housing provided with a series of pockets interiorly thereof, a shaft adapted to be connected with a prime mover to be tested, a rotor in said housing having a series of pockets cooperable with the pockets of said housing to form a working circuit for brake liquid, said rotor being fixed to said shaft for rotation therewith, said housing having an inlet and outlet for said brake liquid; means connected with said inlet and said outlet providing a closed circulating system for said brake liquid; a pressure actuated gauge; and means connecting said gauge with a high pressure zone of said housing, whereby said gauge is actuated by pressure in the brake liquid corresponding to the torque developed by said prime mover.

30. Dynamometer apparatus, comprising: hydraulic power absorption means including a housing having an inlet and an outlet for brake liquid, and a rotor in said housing adapted to be connected with a prime mover to be tested, said rotor having a hub and vanes extending outwardly from said hub to the outer periphery of said rotor and providing individual pockets on said rotor each originating at said hub and extending to the outer periphery of said rotor, said housing having vanes confronting said rotor providing individual pockets in said housing each originating at a point adjacent the hub of said rotor and terminating at a point beyond the outer periphery of said rotor, the pockets of said rotor and stator cooperating to provide a substantially toroidal working circuit for brake liquid; and pressure-responsive power indicating means having communication with the interior of said housing at a pre-selected point of said housing between a pair of adjacent vanes of said housing so that it is responsive to the hydraulic pressure developed in the working circuit of the brake liquid within said housing for indicating the power developed by said prime mover.

EDWIN L. CLINE.

REFERENCES CITED

The following references are of record in the file of this patent:

UNITED STATES PATENTS

| Number | Name | Date |
|---|---|---|
| 1,818,258 | Isaaks | Aug. 11, 1931 |
| 2,035,576 | Taylor | Mar. 31, 1936 |
| 2,039,428 | Lewis | May 5, 1936 |
| 2,218,463 | Bennett | Oct. 15, 1940 |

FOREIGN PATENTS

| Number | Country | Date |
|---|---|---|
| 151,100 | Germany | May 17, 1904 |